US008951319B2

(12) United States Patent
Kim et al.

(10) Patent No.: US 8,951,319 B2
(45) Date of Patent: Feb. 10, 2015

(54) AIR CLEANER AND CONTROLLING METHOD THEREOF

(75) Inventors: Hyun-Woo Kim, Jinhae-si (KR);
Jung-Min Moon, Changwon-si (KR);
Jeong-Sang Seo, Changwon-si (KR);
Kyeong-Bo Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 652 days.

(21) Appl. No.: 12/677,206

(22) PCT Filed: May 29, 2008

(86) PCT No.: PCT/KR2008/003025
§ 371 (c)(1),
(2), (4) Date: Mar. 9, 2010

(87) PCT Pub. No.: WO2009/066843
PCT Pub. Date: May 28, 2009

(65) Prior Publication Data
US 2010/0192768 A1    Aug. 5, 2010

(30) Foreign Application Priority Data

Nov. 19, 2007  (KR) .................. 10-2007-0118116
Nov. 19, 2007  (KR) .................. 10-2007-0118156

(51) Int. Cl.
*B01D 50/00*    (2006.01)
*B01D 45/14*    (2006.01)
(Continued)

(52) U.S. Cl.
CPC ............ *B01D 45/14* (2013.01); *B01D 46/0065* (2013.01); *B01D 46/10* (2013.01); *B01D 46/48* (2013.01)
USPC ................... 55/289; 55/282; 55/295; 55/296; 55/492; 55/495; 15/347

(58) Field of Classification Search
CPC  B60H 3/06–3/0658; B60H 1/00007–1/00207; F01P 2001/00–2001/026; F01P 11/10; B04C 5/22
USPC ............. 62/303–316; 165/4–10, 95, DIG. 10, 165/DIG. 11, DIG. 85; 55/289, 294–300, 55/482, 490–519; 95/8, 23; 15/347
See application file for complete search history.

(56) References Cited

U.S. PATENT DOCUMENTS 2,976,558 A  *  3/1961  Fain ............................ 15/312.1
2,994,434 A  *  8/1961  Moseres ...................... 210/413
(Continued)

FOREIGN PATENT DOCUMENTS

JP         08-57233       3/1996
JP         08-210705      8/1996
JP         2002-79033     3/2002

OTHER PUBLICATIONS

International Search Report issued for PCT/KR2008/003025 dated Dec. 15, 2008.

*Primary Examiner* — Thomas McKenzie
(74) *Attorney, Agent, or Firm* — KED & Associates, LLP

(57) ABSTRACT

An air cleaner adapted to filter out various types of substances through a filter assembly, as well as automatically remove the filtered substances, and a method for controlling the operation of such an air cleaner, are provided. The air cleaner may include a rotation brush unit installed on an inner wall surface of a front panel, facing a front surface of a mesh-type filter body and adapted to rotate while maintaining contact with the front surface of the filter body. When a suction operation is terminated, the rotation brush unit may to remove dust accumulated on the surface of the mesh-type filter body.

15 Claims, 10 Drawing Sheets

(51) Int. Cl.
  *B01D 46/00* (2006.01)
  *B01D 46/10* (2006.01)
  *B01D 46/48* (2006.01)

(56) References Cited

U.S. PATENT DOCUMENTS

| | | | |
|---|---|---|---|
| 3,221,479 A * | 12/1965 | Moser et al. | 55/296 |
| 4,269,264 A * | 5/1981 | Goeldner | 165/95 |
| 4,439,218 A * | 3/1984 | Priepke et al. | 55/288 |
| 5,676,197 A * | 10/1997 | Diebold et al. | 165/41 |
| 5,688,402 A | 11/1997 | Green et al. | |
| 6,248,145 B1 * | 6/2001 | Radke | 55/295 |
| 6,514,303 B2 * | 2/2003 | Lukac et al. | 55/289 |
| 6,758,874 B1 * | 7/2004 | Hunter, Jr. | 55/337 |
| 6,974,487 B2 * | 12/2005 | Twiefel | 55/289 |
| 7,351,269 B2 * | 4/2008 | Yau | 55/297 |
| 7,494,520 B2 * | 2/2009 | Nam et al. | 55/289 |
| 8,034,138 B2 * | 10/2011 | Okada et al. | 55/289 |
| 2002/0088208 A1 * | 7/2002 | Lukac et al. | 55/289 |
| 2004/0003578 A1 * | 1/2004 | Twiefel | 55/289 |
| 2004/0163206 A1 * | 8/2004 | Oh | 15/353 |
| 2005/0132528 A1 * | 6/2005 | Yau | 15/344 |
| 2005/0198766 A1 * | 9/2005 | Nam et al. | 15/352 |
| 2006/0042202 A1 * | 3/2006 | Lee et al. | 55/289 |
| 2006/0137301 A1 * | 6/2006 | Lee | 55/298 |
| 2010/0043362 A1 * | 2/2010 | Okada et al. | 55/296 |

\* cited by examiner

AIR CLEANER AND CONTROLLING METHOD THEREOF

TECHNICAL FIELD

The present invention relates to an air cleaner, and more particularly to a new type of air cleaner adapted to primarily filter out various types of alien substances (e.g. dust) through a filter assembly, as well as automatically remove the alien substances that have been filtered out.

BACKGROUND ART

In general, an air cleaner refers to a device for drawing in polluted indoor air, purifying it, and emitting it into the indoor atmosphere.

Recent air cleaners not only collect dust and microorganisms, but also remove odor when purifying indoor air.

FIG. 1 shows the internal structure of a conventional air cleaner.

Referring to FIG. 1, the conventional air cleaner includes a body 10, a filter assembly 30 positioned inside the body 10 near the front and provided with various filters stacked on one another, a drawing device (not shown) positioned inside the body 10 near the back to guide drawn and emitted air, and a front panel 20 for selectively exposing the front surface inside the body 10.

Indoor air is drawn into the body 10 via an air inlet 11 formed on a lateral surface of the body 10, and passes through the filter assembly 30 and the drawing device successively. Purified air is emitted into the indoor atmosphere via an air outlet 12 formed on the upper surface of the body 10.

The body 10 has a dust sensor unit 13 positioned therein to sense the amount of dust collected by the filter assembly 30.

However, the conventional air cleaner has a problem in that a large amount of dust is filtered out of the indoor air and is accumulated on the surface of one of the filter bodies constituting the filter assembly 30, which is positioned near the air inlet. This requires frequent cleaning.

As a result, a filter for removing dust is necessarily used as the filter body of the filter assembly, which is positioned near the air inlet.

Particularly, when particles of larger sizes are drawn in, they adhere to the surface of the filter body and substantially degrade the air-drawing efficiency.

When the entire filter assembly 30 is separated from the body of the air cleaner to remove dust from the surface of the filter body, dust may be scattered and pollute the indoor atmosphere.

DISCLOSURE

Technical Problem

Therefore, the present invention has been made in view of the above-mentioned problems, and the present invention provides a new type of air cleaner adapted to remove various types of alien substances (e.g. dust), which have been drawn into the body and accumulated on the surface of the filter body, when necessary or periodically and to collect the removed alien substances at a desired place, as well as a method for operating the air cleaner.

Technical Solution

In accordance with an aspect of the present invention, there is provided an air cleaner including a body case having a front opening and containing an air-drawing unit and a filter assembly; a front panel for exposing/covering the front opening of the body case; a filter cover installed on a front surface of the filter assembly; a mesh-type filter body installed on a front surface of the filter cover to filter alien substances out of air flowing into the filter assembly; and a rotation brush unit installed on an inner wall surface of the front panel to face a front surface of the mesh-type filter body and adapted to rotate while maintaining contact with the front surface of the mesh-type filter body.

The filter cover includes a cover body having an opening formed on a central portion so that air can pass through, and a plurality of support ribs formed across the opening of the cover body in a radial direction.

A drop guide unit is formed on a lower portion of a region of the cover body, the opening being formed in the region, to guide falling alien substances separated from the front surface of the mesh-type filter body by the rotation brush unit, and a dust collector is positioned in a bottom space of the filter assembly near the front in an inner space of the body case to collect falling alien substances guided by the drop guide unit.

The drop guide unit includes protrusion-type stop ledges and a single-bodied stop rib formed on two adjacent support ribs among the support ribs formed in the opening of the cover body, respectively, as well as a closing plate closing space between the two ribs, the stop ledges and the stop rib being formed on the two ribs, and the stop ribs protrude along one support rib of the two support ribs, the rotation brush unit passing through the one support rib first with reference to a rotation direction of the rotation brush unit.

Attachment units are positioned on corresponding portions of a back surface of the dust collector and the front surface of the filter cover, respectively, to attach and fix the dust collector, and the attachment units comprise two magnets or a magnet and a metal block corresponding to each other.

According to another aspect of the present invention, there is provided an air cleaner including a rotation brush unit installed to be rotated by selective control, the rotation brush unit rotating while maintaining contact with a surface of a mesh-type filter body installed on a front surface of a filter assembly to rub alien substances, such as dust, from the surface of the mesh-type filter body.

The rotation brush unit includes a rotation wing unit having a core constituting a rotation center and a pair of wing ends extending from both ends of the core; a brush unit extending through back surfaces of the two wing ends constituting the rotation wing unit and protruding toward the surface of the mesh-type filter body; and a brush cover having a coupling end formed on a central portion of a back surface to be shaft-coupled to a driving motor, the brush cover being coupled to a back surface of the rotation wing unit to prevent the brush unit from detaching.

A frame protrudes along a periphery of the rotation wing unit so that the brush cover can be received, and a plurality of stop ledges protrude inward from the frame to block the brush cover partially and prevent the brush cover from escaping.

The brush unit includes a brush extending through one wing end of the rotation wing unit to be exposed to the outside; and a contact plate extending through the other wing end of the rotation wind unit to be exposed to the outside. The contact plate includes a plurality of contact ends adapted to contact the surface of the mesh-type filter body and a plurality of non-contact ends spaced from the surface of the mesh-type filter body.

Through slits are formed on the pair of wing ends constituting the rotation wing unit, respectively, front portions of the brush and the contact plate are installed to be partially exposed to the outside via the through slits, respectively, and stop ribs are formed on rear portions of the brush and the contact plate, respectively, and have such a width that the stop ribs do not pass through respective through slits.

A support protrusion protrudes from a back surface of the brush cover to prevent the brush unit from being pushed backward by contact with the mesh-type filter body.

The pair of wing ends constituting the rotation wing unit are curved and have vertical symmetry with each other.

According to another aspect of the present invention, there is provided a method for controlling operation of an air cleaner, the method including the steps of (a) confirming if an air-drawing unit has stopped operation; and (b) operating a rotation brush unit to remove dust accumulated on a surface of a mesh-type filter body installed near an air inlet of a filter assembly when it has been confirmed that the air-drawing unit has stopped operation.

The method further includes a step of (c) sensing the amount of dust accumulated on the surface of the mesh-type filter before conducting step (b) so that step (b) is conducted when the amount of dust exceeds a threshold.

Advantageous Effects

As mentioned above, the air cleaner according to the present invention and the method for controlling its operation are advantageous in that, when dust is filtered out of indoor air and accumulated on the surface of the mesh-type filter body of the filter assembly near the air inlet, the dust is automatically removed, which means that the user does not need to clean the filter body manually.

Particularly, the mesh-type filter body is frequently cleaned to remove accumulated dust, which would otherwise degrade the drawing efficiency.

In addition, when the dust accumulated on the surface of the mesh-type filter body is removed, the dust is not influenced by the air-drawing force, but falls vertically into the dust collector.

BRIEF DESCRIPTION OF THE DRAWINGS

The foregoing and other objects, features and advantages of the present invention will become more apparent from the following detailed description when taken in conjunction with the accompanying drawings in which.

MODE FOR INVENTION

Hereinafter, an air cleaner according to an exemplary embodiment of the present invention will be described with reference to FIGS. 2-10.

Figure 2:
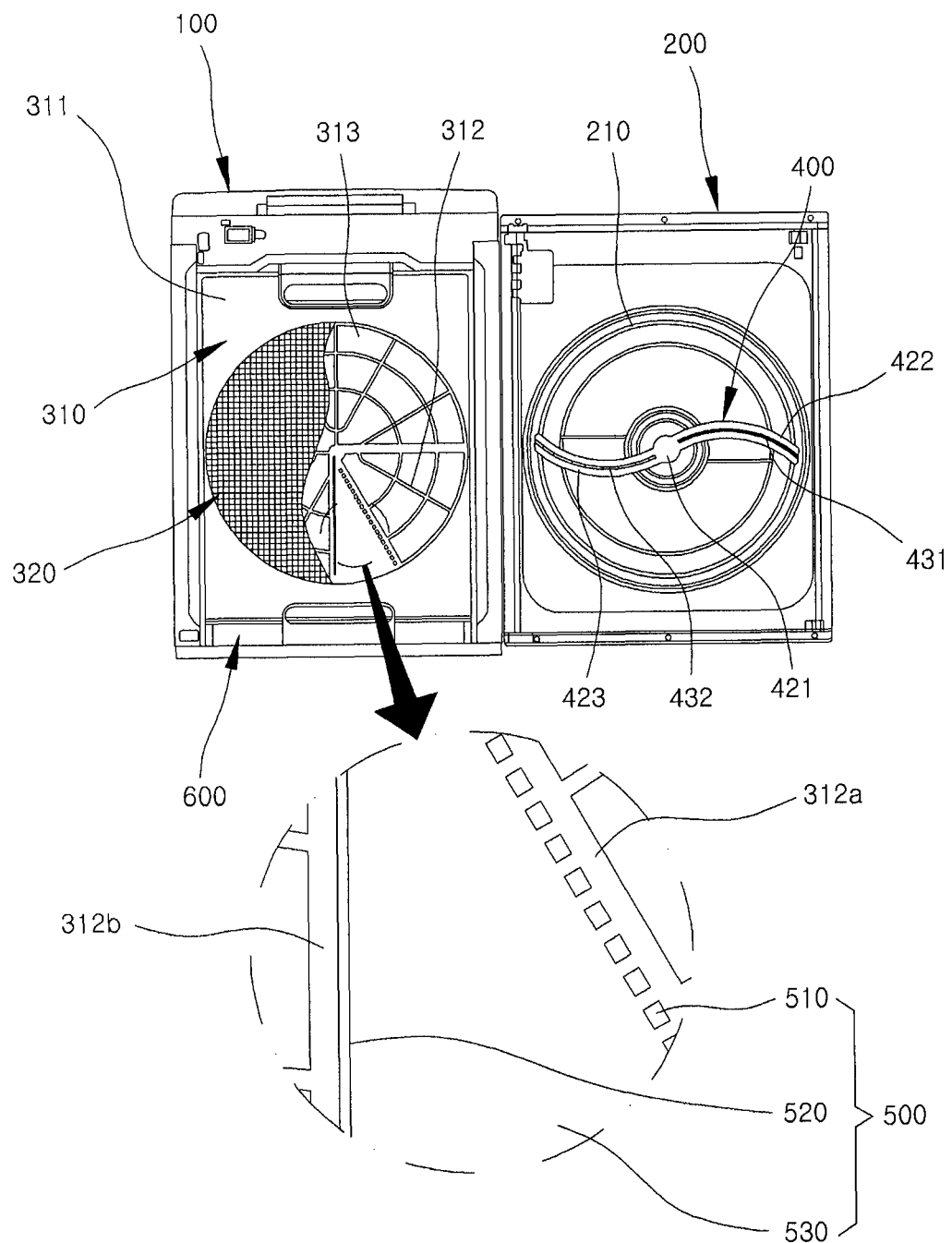
FIG. 2 is a front view showing the internal structure of an air cleaner according to an embodiment of the present invention with the front panel fully open.

Referring to FIG. 2, an air cleaner according to an embodiment of the present invention includes a body case 100, a front panel 200, a filter cover 310, a mesh-type filter body 320, and a rotation brush unit 400.

Respective components of the air cleaner will now be described in more detail.

The body case 100 constitutes the exterior of the air cleaner.

The body case 100 has the shape of a box, which has a front opening and an inner containing space.

The body case 100 contains an air-drawing unit (not shown) and a filter assembly 300.

The air-drawing unit is adapted to circulate indoor air, and includes a motor and a fan.

The filter assembly 300 incorporates a plurality of filter bodies (not shown) for removing alien substances (e.g. dust) or odor from air that has been drawn into the body case 100.

The air-drawing unit is positioned in the inner space of the body case 100 near the back. The filter assembly 300 is positioned in the inner space of the body case 100 near the front.

The body case 100 has an air inlet 11 through which indoor air is drawn into the body case 100, and an air outlet 12 for emitting purified air.

Figure 1:
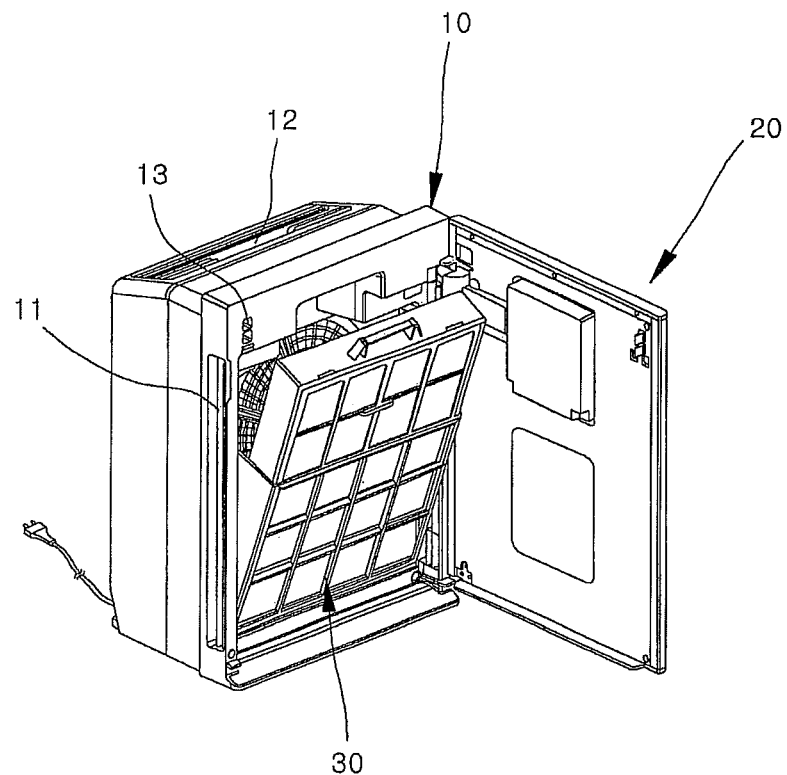
FIG. 1 is a perspective view showing the internal structure of a conventional air cleaner.

According to an embodiment of the present invention, air inlets 11 are vertically formed on both lateral surfaces of the body case 100 near the front, respectively, and an air outlet 12 is formed on the upper surface of the body case 100. This configuration is the same as in the case of the conventional air cleaner shown in FIG. 1. Therefore, the same reference numerals are given to the same components, and repeated description thereof will be omitted herein.

The front panel 200 will now be described.

The front panel 200 acts as a door for selectively exposing/covering the front opening of the body case 100, and is rotatably installed on the front of the body case 100.

The front panel 200 has the shape of a box having a predetermined installation space defined therein.

The filter cover 310 will now be described.

The filter cover 310 is adapted to prevent respective filter bodies (not shown), which are contained in the filter assembly 300, from escaping, and is installed to cover the front of the filter assembly 300.

Figure 3:
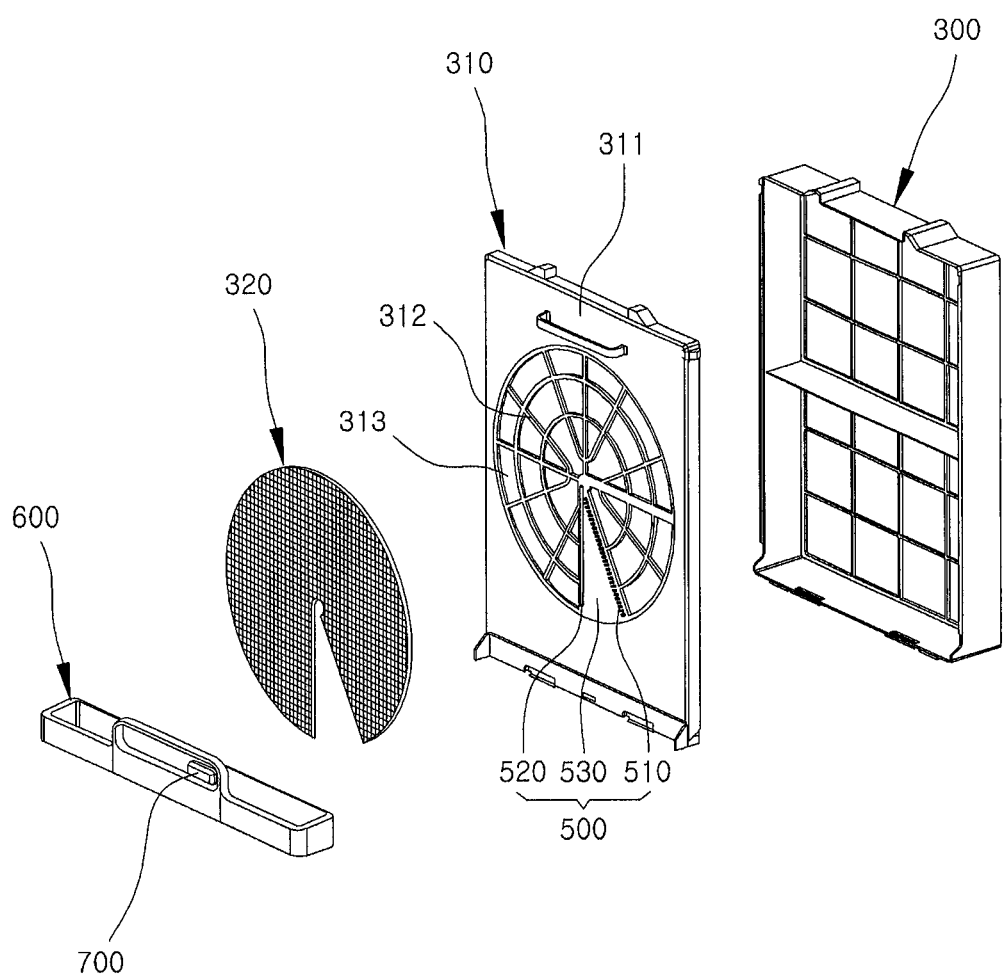
FIG. 3 is an exploded perspective view briefly showing the interconnection among a filter assembly, a filter cover, a mesh-type filter body, and a dust collector of an air cleaner according to an embodiment of the present invention.

The filter cover 310 includes a cover body 311 and a plurality of support ribs 312 as shown in FIG. 3.

The cover body 311 constitutes the body of the filter cover 310, and has an opening 313 formed at the center so that air can pass through. The opening 313 spans the same region as the rotation path of the rotation brush unit 400 (descried later).

The support ribs 312 are adapted to prevent the mesh-type filter body 320, which is to be positioned in front of the opening 313, from being displaced backward. The support ribs 312 extend through the opening 313 in the radial direction.

The mesh-type filter body 320 will now be described.

The mesh-type filter body 320 is a pre-filter for primarily filtering alien substances out of air flowing into respective filter bodies of the filter assembly 300. The filter body 320 has the shape of a mesh, and is installed to cover the exposed front surface of the filter cover 310.

Although various structures may be adopted to install the mesh-type filter body 320 to cover the front surface of the filter cover 310, it is assumed according to an embodiment of the present invention that the mesh-type filter body 320 is forced against and fixed to the front surface of the filter cover 310.

This is for the purpose of preventing the penetration of alien substances (e.g. dust) via a gap, if any, between the mesh-type filter body 320 and the front surface of the filter cover 310.

Although the mesh-type filter body 320 may have the same shape as the front surface of the filter cover 310, it is assumed according to an embodiment of the present invention that the filter body 320 has a size large enough to cover the opening 313 and a circular shape identical to that of the opening 313, as shown in FIG. 3.

The rotation brush unit 400 will now be described.

The rotation brush unit 400 is adapted to remove alien substances (e.g. dust), which have been accumulated on the front surface of the mesh-type filter body 320, from it.

Referring to FIG. 2, the rotation brush unit 400 is rotatably installed on the inner wall surface of the front panel 200 so that, if necessary, the rotation brush unit 400 is rotated while maintaining contact with the front surface of the mesh-type filter 320 to rub alien substances from it.

Figure 4:
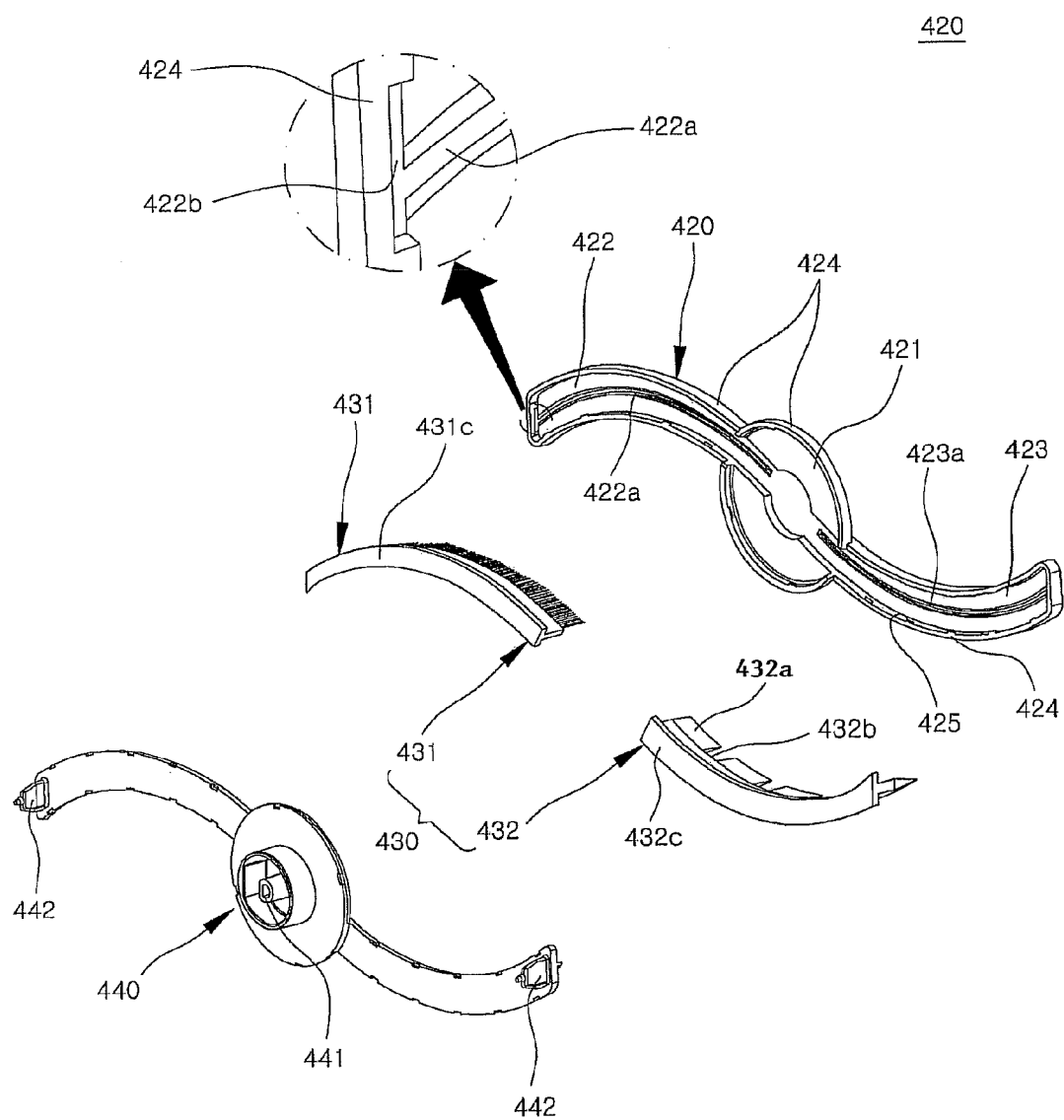
FIG. 4 is an exploded perspective view of a rotation brush unit according to an embodiment of the present invention.
Figure 5:
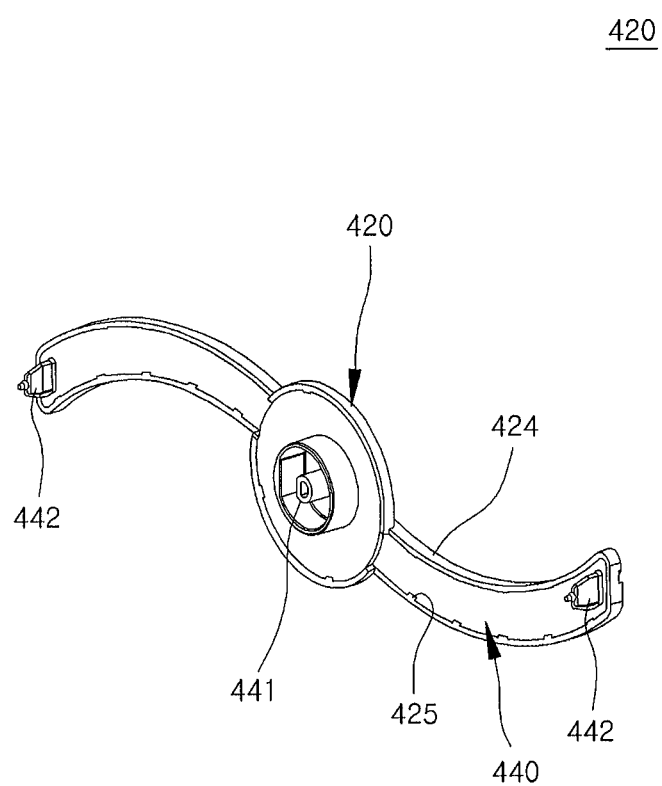
FIG. 5 is a perspective view showing a rotation brush unit according to an embodiment of the present invention when it has been assembled.
Figure 6:
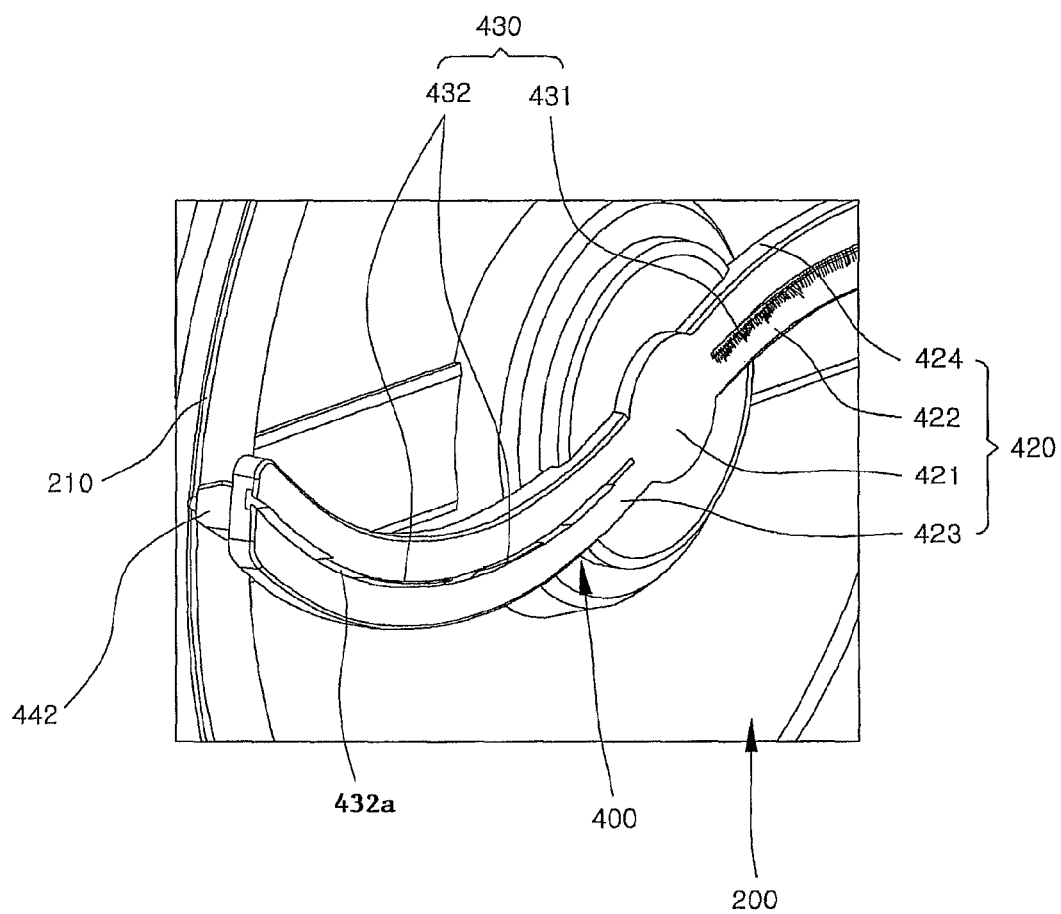
FIG. 6 is a perspective view briefly showing the main part of a rotation brush unit according to an embodiment of the present invention to illustrate its installation structure.
Figure 7:
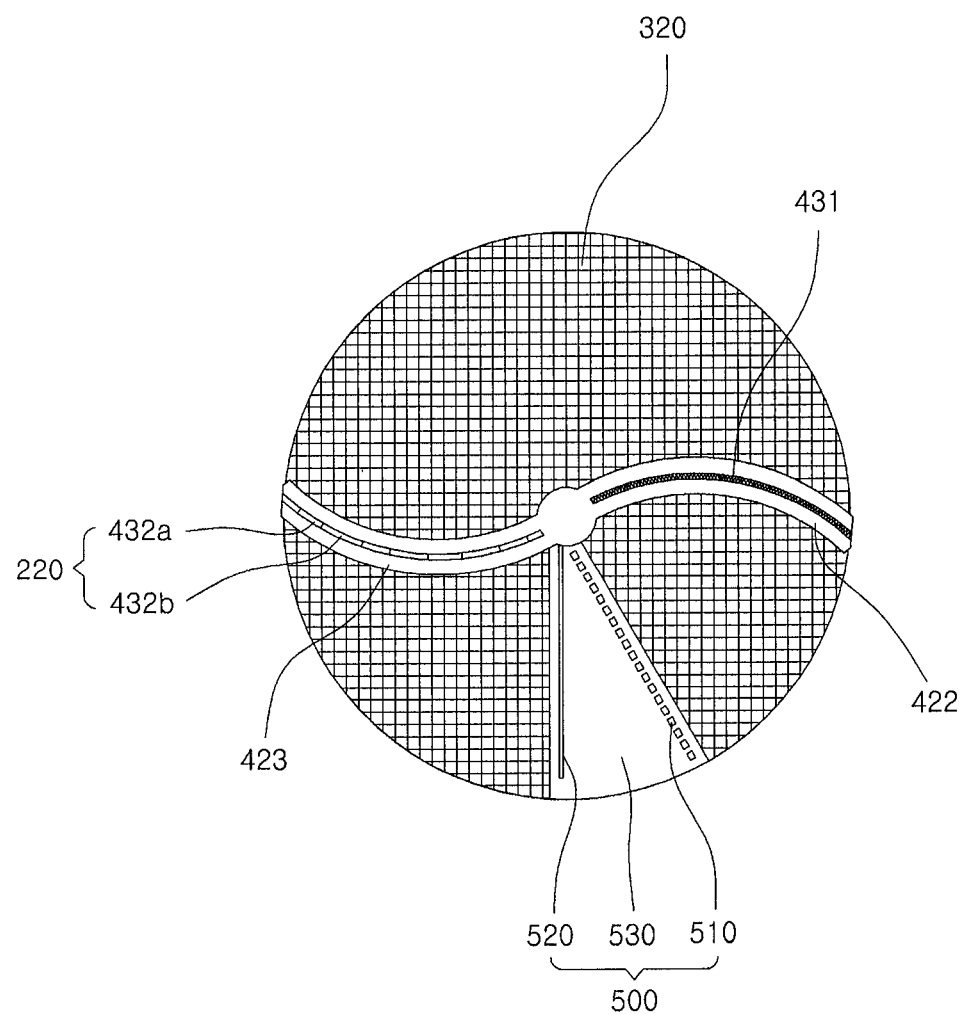
FIGS. 7-10 are front views showing the operation of a rotation brush unit according to an embodiment of the present invention.
Figure 8:
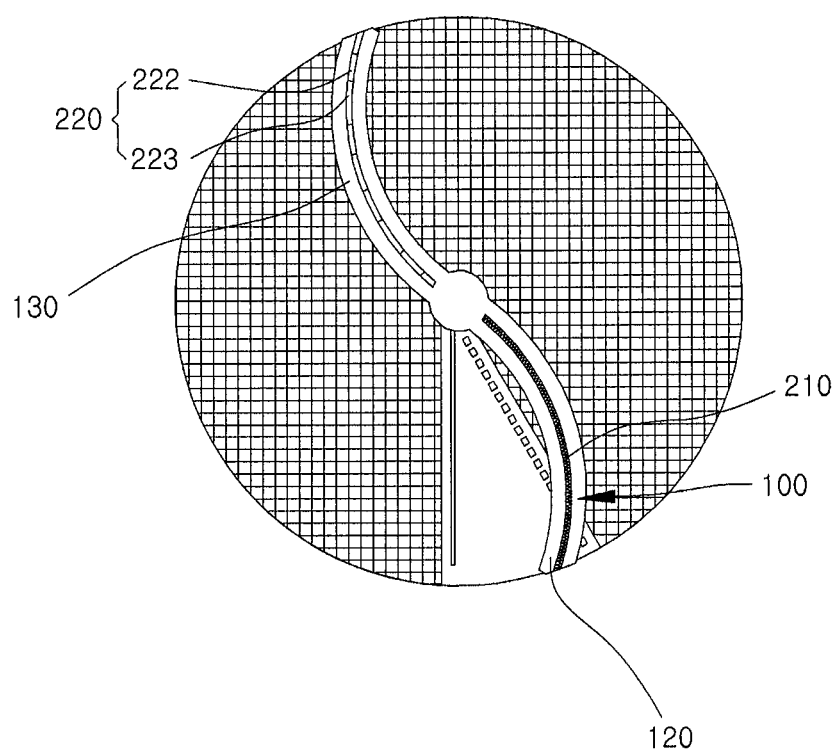
Figure 9:
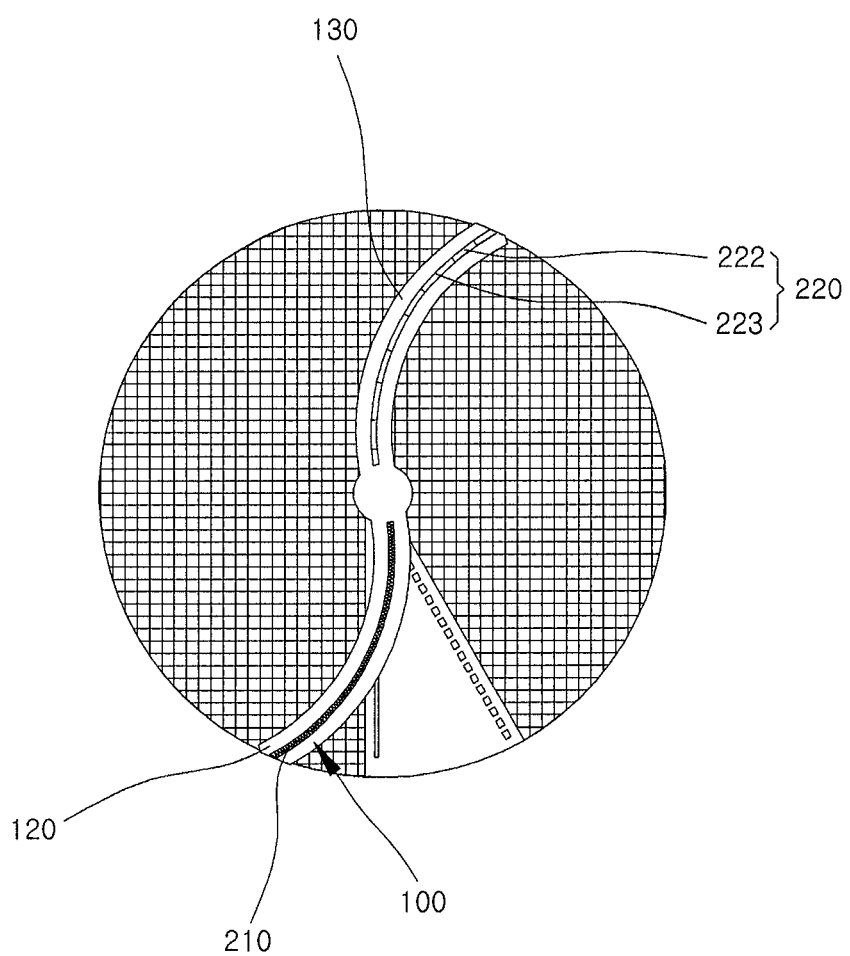
Figure 10:
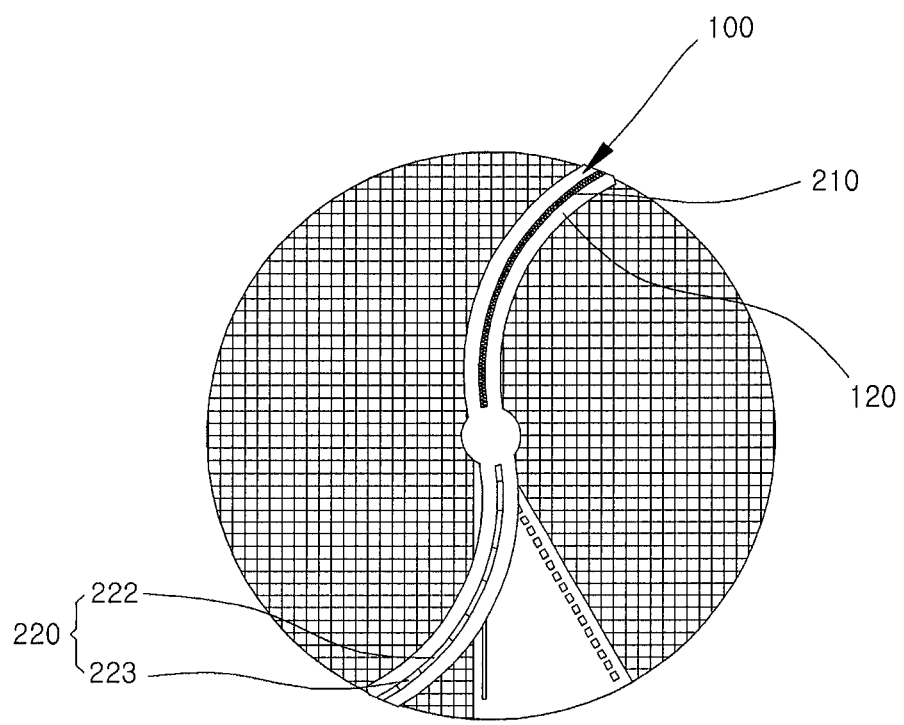

Referring to FIGS. 4-6, the rotation brush unit 400 includes a driving motor (not shown), a rotation wing unit 420, a brush unit 430, and a brush cover 440.

The driving motor is installed in the installation space inside the front panel 200, and has a shaft extending through the inner wall surface of the front panel 200 to be exposed to the outside.

The rotation wing unit 420 is installed on the inner wall surface of the front panel 200, which faces the mesh-type filter 320, and is coupled to the shaft of the driving motor to be rotated.

The rotation wing unit 420 includes a core 421 constituting the center of rotation (a portion shaft-coupled to the driving motor) and a pair of wings 422 and 423 extending from both sides of the core 421. The wings 422 and 423 are curved and have vertical symmetry with reference to the core 421. This structure is for the purpose of minimizing resistance occurring when the brush unit 430 contacts the mesh-type filter body 320 and rotates as a result of rotation of the rotation wing unit 420.

The rotation wing unit 420 has a frame 424 formed along the periphery so that the brush cover 440 can be received therein. A plurality of stop ledges 425 protrude inward from the frame 424 so that, when the brush cover 440 is installed on the frame 424, the stop ledges 425 partially block the brush cover 440 and prevent it from escaping.

The brush unit 430 is installed to extend through the back surface of both wings 422 and 423 constituting the rotation wing unit 420 and protrude toward the surface of the mesh-type filter body 320.

The brush unit 430 includes a brush 431 extending through one 422 of the two wings (hereinafter, referred to as a first wing) to be exposed to the outside, and a contact plate 432 extending through the other wing 423 (hereinafter, referred to as a second wing) to be exposed to the outside.

The contact plate 432 is made of a material that can be bent, such as rigid synthetic resin (e.g. rubber), or a thin plate.

The contact plate 432 includes a plurality of contact ends 432a adapted to contact the mesh-type filter body 320, and a plurality of non-contact ends 432b spaced from the mesh-type filter body 320. The plurality of contact ends 432a and the plurality of non-contact ends 432b may be alternately formed along the contact plate 432.

The width of the contact ends 432a is preferably larger than that of the non-contact ends 432b. This is for the purpose of both maximizing the area of contact between the contact plate 432 and the mesh-type filter body 320 and rubbing dust from the surface of the mesh-type filter body 320 efficiently.

The rotation wing unit 420 and the brush unit 430 also have the following structure: the pair of wings 422 and 423 of the rotation wing unit 420 have through slits 422a and 423a formed, respectively therein. The front portions of the brush 431 and the contact plate 432 extend respectively through slits 422a and 423a to be partially exposed to the outside. The rear portions of the brush 431 and the contact plate 432 are provided with stop ribs 431c and 432c having a width determined so that they do not pass through slits 422a and 423a.

This structure guarantees that the brush unit 430 remains stably installed on the rotation wing unit 420.

According to an embodiment of the present invention, the contact plate 432 is installed to extend through the second wing 423 from the rear surface to the front, and the brush 431 is installed to extend through the lateral end wall of the first wing 422 to be inserted into the inner portion of the first wing 422. This is because, although the contact plate 432 may easily pass through the through slit 423a, it is very difficult for the brush 431 to pass through the through slit 422a in such a direction that the brush 431 is exposed.

Therefore, the first wing 422 has an insertion hole 422b formed on the outer surface in a sectional shape corresponding to that of the stop rib 431c of the brush 431 so that the stop rib 431c can be inserted into the insertion hole 422b and extend through it. In other words, the brush 431 is coupled to the first wing 422 by inserting the stop rib 431c into the insertion hole 422b so as to extend through it.

The brush cover 440 is coupled to the back surface of the rotation wing unit 420 to prevent the brush unit 430 from detaching.

The brush cover 440 has an overall shape corresponding to that of the rotation wing unit 420, and a coupling end 441 is formed at the center of the back surface (which faces the inner wall surface of the front panel) of the brush cover 440 to be shaft-coupled to the driving motor.

The brush cover 440 has support protrusions 442 formed on both ends of its back surface, and the front panel 200 has a corresponding guide recess 210 formed on its inner wall surface to guide the movement of the support protrusions 442.

The support protrusions 442 protrude to contact the inner wall surface of the front panel 200 so that the brush unit 430 is not pushed backward by the contact with the mesh-type filter body 320. This ensures that, when the rotation wing unit 420 is rotated, the brush 431 and the contact plate 432 always maintain contact with the surface of the mesh-type filter body 320.

According to an embodiment of the present invention, a drop guide unit 500 is formed on the front surface of the cover body 311 constituting the filter cover 310 to guide falling alien substances. A dust collector 600 is positioned in the inner space of the body case 100, particularly in the bottom space of the filter assembly 300 near the front, to collect falling alien substances guided by the drop guide unit 500, as shown in FIGS. 2 and 3.

The drop guide unit 500 is formed on a part of the region of the cover body 311, in which the opening 313 is formed, and the mesh-type filter body 320 has a cutout corresponding to the region in which the drop guide unit 500 is formed. In other words, the mesh-type filter body 320 does not exist in the dust-collecting region created by the drop guide unit 500.

This construction guarantees that, when alien substances are separated from the mesh-type filter body 320 by the brush unit 430, they can fall freely without being affected by the air-drawing force provided via the opening 313.

The drop guide unit 500 includes stop ledges 510, a stop rib 520, and a closing plate 530 for preventing air from passing through.

The stop ledges 510 and the stop rib 520 are installed on two adjacent ribs 312a and 312b, respectively, among the support ribs 312 formed in the opening 313 of the cover body 311, as shown in FIG. 2. The closing plate 530 is formed to close the space between the two adjacent support ribs 312a and 312b.

The stop ledges 510 protrude along one of the two adjacent ribs 312a and 312b through which the brush unit 400 passes first with reference to the direction of rotation of the brush unit 400 (i.e., the rib 312a when rotating in a clockwise direction on the drawings). The stop ledges 510 have a toothed shape (i.e. protrusions and indentations alternate with each other).

Particularly, the drop guide unit 500 is formed in the central region of the lower portion of the filter cover 310 to minimize the region of the opening 313 through which falling alien substances pass, so that they flow into the filter assembly 300 as much as possible without being scattered to the surroundings.

The dust collector 600 has the shape of a box with an upward opening, and is installed in the bottom space of the filter assembly 300 near the front in a selectively removable manner.

Although various structures may be employed to attach/detach the dust collector 600, corresponding attachment units 700 (e.g. two magnets, or a magnet and a metal block) are preferably installed on the back surface of the dust collector 600 and on the front surface of the cover body 311 constituting the filter cover 310, respectively, so that they can be easily attached to or detached from each other.

Processes for controlling the operation of the air cleaner according to an embodiment of the present invention will now be described.

In the case of operation control for purifying indoor air based on the user's need, the air cleaner is driven to purify indoor air in the same manner as conventional air cleaners do.

Particularly, the air-drawing unit is driven to generate air-drawing force, which draws indoor air into the body case 100 via the air inlets 11 formed on both lateral surfaces of the body case 100. Then, the air passes through the filter assembly 300 inside the body case 100, and purified air is emitted to the indoor atmosphere via the air inlet 12 formed on the upper surface of the body case 100.

When air flows through the filter assembly 300, the mesh-type filter body 320 and other filter bodies remove alien substances (e.g. dust) and odorous components from the air.

If the air cleaner pauses after completing the above-mentioned series of processes, or when the user aborts the operation, the air-drawing unit is turned off, and no more air flows.

Then, the rotation brush unit 400 functions to clean the surface of the mesh-type filter body 320 on the front surface of the filter cover 310.

Particularly, the driving motor of the rotation brush unit 400 is driven to rotate the rotation wing unit 420. Then, the brush 431 and the contact plate 432 rotate while maintaining contact with the surface of the mesh-type filter body 320 and rub alien substances from the surface, as shown in FIGS. 7-10.

More particularly, the brush 431 rotates while contacting the surface of the mesh-type filter body 320 so that dust accumulated on the surface is removed and dropped. As a result, a lump of dust moves along the brush 431.

The contact plate 432 follows the brush 431 and entrains some particles, which have been separated from the surface of the mesh-type filter body 320 by the brush 431 but have not been entrained by the brush 431, in a repeated manner.

As a result, the alien substances (e.g. dust) are lumped together and moved along the direction of rotation of the brush 431 and the contact plate 432. When the alien substances reach the region in which the plurality of stop ledges 510 constituting the drop guide unit 500 are formed, they stop rotating and fall.

Although some particles may pass through the stop ledges 510, they are stopped by the stop rib 520 and fall vertically instead of being entrained by the brush 431 and the contact plate 432 any further.

The alien substances falling after being separated from the mesh-type filter body 320 are collected by the dust collector 600 positioned on the bottom.

The user has only to empty the dust collector 600 when necessary. This completes the surface cleaning of the mesh-type filter body 320.

Those skilled in the art can understand that the surface cleaning of the mesh-type filter body 320 is not necessarily conducted when the air cleaner pauses or when it is turned off.

This means that the rotation brush unit 400 can be operated to clean the surface of the mesh-type filter body 320 even when the air cleaner is functioning to purify indoor air.

This is because the space between the stop ledges 510 and the stop rib 520 constituting the drop guide unit 500 is closed by the closing plate 530 so that the flow of dust falling into the dust collector 600 via the corresponding region is hardly affected.

It is also possible to sense the amount of dust accumulated on the surface of the mesh-type filter body 320 before the rotation brush unit 400 starts operation. In this case, the rotation brush unit 400 is controlled to clean the surface of the mesh-type filter body 320 only if the amount of dust exceeds a threshold.

This is possible because recently developed air cleaners are commonly equipped with dust sensing sensors or odor sensing sensors.

Although several exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. An air cleaner, comprising:
a case having a front opening formed therein;
an air-drawing device and a filter assembly received in the case;
a front panel coupled to the case to open and close the front opening of the case;
a filter cover installed in the case, at a position corresponding to the front opening formed in the case, and at a front surface of the filter assembly;
a mesh filter installed on a front surface of the filter cover to filter particles from air flowing into the filter assembly;
a rotating brush assembly installed on an inner wall surface of the front panel so as to face a front surface of the mesh filter, wherein the rotating brush assembly rotates while maintaining contact with the front surface of the mesh filter when the front opening of the case is closed by the front panel, wherein the rotating brush assembly is configured to be selectively rotated and to maintain contact with the front surface of the mesh filter so as to dislodge alien substances from the front surface of the mesh filter; and a driving motor mounted at the front panel and operably coupled to the rotating brush assembly to drive the rotating brush assembly.

2. The air cleaner as claimed in claim 1, wherein the filter cover comprises:
a cover body having an opening formed on a central portion so that air can pass through; and
a plurality of support ribs formed across the opening of the cover body in a radial direction.

3. The air cleaner as claimed in claim 2, further comprising:
a drop guide unit formed on a lower portion of a predetermined region of the cover body, the opening in the cover body being formed in the predetermined region, so as to guide alien substances separated from the front surface of the mesh-type filter body by the rotating brush assembly; and
a dust collector positioned in a bottom space of the filter assembly in an inner space of the case to collect the alien substances guided by the drop guide unit.

4. The air cleaner as claimed in claim 3, wherein the drop guide unit comprises:
protrusion-type stop ledges and a single-bodied stop rib formed on two adjacent support ribs of the support ribs formed in the opening of the cover body, respectively; and
a closing plate closing a space between the two adjacent support ribs, wherein the stop ledges protrude along a first of the two adjacent support ribs and the stop rib protrudes along a second support rib of the two adjacent support ribs, with the rotating brush assembly passing through the first support rib first with reference to a rotation direction of the rotating brush assembly.

5. The air cleaner as claimed in claim 3, further comprising attachment units respectively positioned on corresponding portions of a back surface of the dust collector and the front surface of the filter cover to attach and fix the dust collector to the front surface of the filter cover, wherein the attachment units comprise two magnets or a magnet and a metal block corresponding to each other.

6. The air cleaner as claimed in claim 1, wherein the rotating brush assembly comprises:
a rotation wing unit having a core constituting a center of rotation of the rotation wing unit and a pair of wing ends extending from two opposite ends of the core;
a brush unit extending through back surfaces of the pair of wing ends and protruding toward the front surface of the mesh filter; and
a brush cover having a coupling end formed on a central portion of a back surface thereof to be shaft-coupled to a driving motor, the brush cover being coupled to a back surface of the rotation wing unit to prevent detachment of the brush unit.

7. The air cleaner as claimed in claim 6, further comprising a frame that protrudes along a periphery of the rotation wing unit so as to receive the brush cover, and a plurality of stop ledges that protrude inward from the frame to partially block the brush cover and prevent separation of the brush cover.

8. The air cleaner as claimed in claim 6, wherein the brush unit comprises:
a brush extending through one wing end of the rotation wing unit to be exposed to the outside; and
a contact plate extending through the other wing end of the rotation wing unit to be exposed to the outside.

9. The air cleaner as claimed in claim 8, wherein the contact plate comprises a plurality of contact ends adapted to contact the front surface of the mesh filter and a plurality of non-contact ends spaced apart from the front surface of the mesh filter.

10. The air cleaner as claimed in claim 8, further comprising through slits respectively formed on the pair of wing ends, wherein front portions of the brush and the contact plate are installed to be partially exposed to the outside via the through slits, respectively, and stop ribs are formed on rear portions of the brush and the contact plate, respectively, and wherein a width of the stop ribs is such that the stop ribs do not pass through respective through slits.

11. The air cleaner as claimed in claim 6, further comprising a support protrusion that protrudes from a back surface of the brush cover to prevent the brush unit from being pushed backward by contact with the mesh filter.

12. The air cleaner as claimed in claim 6, wherein the pair of wing ends constituting the rotation wing unit are curved and have vertical symmetry with each other.

13. The air cleaner as claimed in claim 9, wherein the plurality of contact ends and the plurality of non-contact ends are alternately arranged along the stop rib, with the plurality of contact ends extending out through the other wing end of the rotation wing unit.

14. The air cleaner as claimed in claim 1, wherein the mesh filter is a substantially flat disc shaped filter and wherein the rotating brush assembly maintains sliding contact with one planar surface of the mesh filter as the rotating brush assembly rotates to dislodge accumulated particles therefrom.

15. An air cleaner, comprising:
a case having a receiving space formed therein configured to receive an air-drawing device and a filter assembly therein, the case having an access opening providing access to the receiving space;
a front panel coupled to the case to open and close the access opening;
a filter cover provided at the access opening and positioned to cover a front surface of the filter assembly, the filter cover comprising:
a cover body having an opening formed at a central portion thereof to guide air therethrough;
a plurality of support ribs extending radially across the opening formed in the cover body; and
a drop guide formed at a lower portion of the opening in the cover body;
a mesh filter installed on a front surface of the filter cover to filter particles from air flowing into the filter assembly; and
a rotating brush assembly installed on an inner wall surface of the front panel so as to face a front surface of the mesh filter and configured to be rotated by a driving motor mounted at the front panel, wherein the rotating brush assembly rotates while maintaining contact with the front surface of the mesh filter when the access opening of the case is closed by the front panel, wherein the rotating brush assembly is configured to be selectively rotated and to maintain contact with the front surface of the mesh filter so as to dislodge alien substances from the front surface of the mesh filter,
wherein the drop guide of the filter cover comprises:
a plurality of stop ledges and a single-bodied stop rib respectively formed on two adjacent support ribs of the support ribs formed in the opening of the cover body; and
a closing plate closing a space between the two adjacent support ribs, wherein the plurality of stop ledges protrude along a first support rib of the two adjacent support ribs and the stop rib protrudes along a second support rib of the two adjacent support ribs, with the rotating brush assembly passing through the first support rib first with reference to a rotation direction of the rotating brush assembly.

* * * * *